US012573517B2

(12) United States Patent
Cooper et al.

(10) Patent No.: US 12,573,517 B2
(45) Date of Patent: Mar. 10, 2026

(54) METHODS FOR PRODUCING RADIONUCLIDES

(71) Applicant: Battelle Energy Alliance, LLC, Idaho Falls, ID (US)

(72) Inventors: Justin T. Cooper, Idaho Falls, ID (US); Ariana A. Foley, Los Alamos, NM (US); Mathew S. Snow, Idaho Falls, ID (US); Jessica L. Meiers, Idaho Falls, ID (US); Mathew T. Kinlaw, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/816,965

(22) Filed: Aug. 2, 2022

(65) Prior Publication Data

US 2023/0048265 A1 Feb. 16, 2023

Related U.S. Application Data

(60) Provisional application No. 63/203,858, filed on Aug. 2, 2021.

(51) Int. Cl.
*G21G 1/12* (2006.01)
*G21G 1/00* (2006.01)

(52) U.S. Cl.
CPC ............... *G21G 1/12* (2013.01); *G21G 1/001* (2013.01); *G21G 2001/0094* (2013.01)

(58) Field of Classification Search
CPC .. G21G 1/10; G21G 1/001; G21G 2001/0094; G21G 1/12; G21G 1/04
See application file for complete search history.

(56) References Cited

U.S. PATENT DOCUMENTS 9,129,714 B2 9/2015 Noonan et al.
2011/0073815 A1 * 3/2011 Munro, III ............. C01B 33/00 423/249

(Continued)

FOREIGN PATENT DOCUMENTS

EP 3637436 A1 4/2020

OTHER PUBLICATIONS

Suzanne Lapi, et al., "Production and Evaluation of High Specific Activity 186Re: an isotope for radioimmunotherapy in cancer treatment", Simon Fraser University (2007). (Year: 2007).*

(Continued)

*Primary Examiner* — Sharon M Davis
(74) *Attorney, Agent, or Firm* — TraskBritt

(57) ABSTRACT

A method for producing a radionuclide comprises irradiating a target material with a linear accelerator to produce a radionuclide, dissolving the irradiated target material comprising the radionuclide, and separating the radionuclide from the irradiated target material. The irradiated target material may be dissolved in an acidic solution comprising one or more mineral acids. The target material may include a tungsten target material, such as a natural tungsten target material comprising one or more of $^{180}W$, $^{182}W$, $^{183}W$, $^{184}W$, and $^{186}W$ or a tungsten target material exhibiting an elemental purity of about 99.95%. Additional methods for producing tantalum radioactive isotopes are disclosed.

14 Claims, 6 Drawing Sheets

(56) References Cited

U.S. PATENT DOCUMENTS

| | | | | |
|---|---|---|---|---|
| 2017/0251547 | A1* | 8/2017 | Ito | H05H 6/00 |
| 2019/0259505 | A1 | 8/2019 | Murakami et al. | |
| 2020/0108348 | A1 | 4/2020 | Snow et al. | |

OTHER PUBLICATIONS

Butement, F. D. S. "New Radioactive Isotopes Produced by Nuclear Photo-Disintegration." Proceedings of the Physical Society. Section A 64.4 (1951): 395. (Year: 1951).*

Berman, B. L., et al. "Giant resonance in deformed nuclei: Photoneutron cross sections for Eu 153, Gd 160, Ho 165, and W 186." Physical Review 185.4 (1969): 1576. (Year: 1969).*

Baosheng, Yu, Han Yinlu, and Zhang Jingshang. "Evaluation of cross sections of photonuclear reactions for {sup 180,182,183,184, 186} W below 30 MeV." (1998). (Year: 1998).*

Moses et al. "Some synchrotron produced radioactivities of tantalum" (Dec. 1950) Ames Laboratory ISC Technical Reports. 26. http://lib.dr.iastate.edu/ameslab_iscreports/26.

Psarros et al. "Rapid Production of No-carrier-added tSF- from 2-Fluoroaniline Via the 19F(y,n)18F Reaction, Using a Hospital Electron Linear Accelerator" Appl. Radiat. Isot. vol. 46, No. 2, pp. 123-124, 1995 (Received May 18, 1993; & revised form Sep. 7, 1994).

Shigeta et al. "Tantalum-183: Cyclotron Production of a Neutron-Rich Biomedical Tracer" Appl. Radiat. Isot. vol. 47, No. 2, pp. 171-174, 1996 (Received May 11, 1995).

Silari "Radionuclide production and radiation therapy" ASP 2014, 69 pages.

Snow et al., "Extraction Chromatographic Separations of Tantalum and Tungsten from Hafnium and Complex Matrix Constituents", Journal of Chromatography A, 1484, 2017, 6 pages.

Snow et al., "Fundamental Distribution Coefficient Data and Separations Using Eichrom Extraction Chromatographic Resins", Journal of Chromatography A, 1620, 2020, 7 pages.

Lahiri et al. "Separation of carrier free dysprosium and terbium isotopes from 12C6+ irradiated Nd2O3" Applied Radiation and Isotopes 51 pp. 27-32, (1999) Accepted Nov. 4, 1998.

Lahiri et al. "Separation of Carrier Free Lutetium Produced in Proton Activated Ytterbium with HDEHP" Appl. Radiat. Isot. vol. 49, No. 8, pp. 911-913, 1998 (Received Jun. 5, 1997; accepted Aug. 5, 1997).

* cited by examiner

METHODS FOR PRODUCING RADIONUCLIDES

CROSS-REFERENCE TO RELATED APPLICATION

This application claims the benefit under 35 U.S.C. § 119(e) of U.S. Provisional Patent Application Ser. No. 63/203,858, filed Aug. 2, 2021, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The disclosure relates generally to a method for production of radionuclides. More specifically, the disclosure relates to the production of radionuclides using bremsstrahlung radiation.

BACKGROUND

A radionuclide is a radioactive isotope of an element, which is the result of either the element's atoms containing an unstable combination of neutrons and protons, or the atoms having excess energy in their nuclei. Radionuclides may occur naturally or as the result of nuclear reactions altering the atom. For example, irradiating an isotope of a specific element (e.g., tantalum, molybdenum, technetium, etc.), with bremsstrahlung X-ray radiation may cause it to have excess energy. This excess energy may cause the isotope to undergo radioactive decay in an attempt to return it to a more stable state. During radioactive decay, charged particles (e.g., beta particles, alpha particles) and often a high energy form of electromagnetic radiation, a gamma ray photon, is released, and the nucleus changes from a higher energy state to a lower energy state. The rate of this emission is characterized by the half-life of that specific radionuclide, which is defined as the time required for half of the original number of atoms to decay. The radionuclide may be used in applications such as nuclear medicine, isotopic labeling, and national security, and in such applications, short-lived radionuclides may be desired.

Conventional methodologies for isolating short-lived radionuclides (e.g., isotopes with half-lives of less than about 1 week) from other products (e.g., other stable isotopes) created by the irradiation often include multiple, single stage gravimetric separation steps. Each separation act (e.g., stage) may use a chromatography column and process configured to target and enable isolation of a particular one or more isotopes. Often, the individual separation stages are not compatible for isolating or separating short-lived radionuclides from the other products. Thus, to separate an isotope or group of isotopes, additional separation stages may be needed, and the materials, equipment, or conditions most appropriate for the additional separations may be different from the materials, equipment, or conditions used for the preceding separations.

These additional separation stages may significantly increase the time, labor, and cost of completing a separation, isolation, and/or analysis of short-lived radionuclides from other products. Additionally, since the short-lived radionuclides have short half-lives (e.g., the half-life of tantalum-185 is about 49 minutes), this process may compromise the efficacy and utility of the radionuclides. And, the transportation of materials to conduct additional stages may introduce an opportunity for accidents, sample losses, and potentially radioactive contamination of the workspace.

BRIEF SUMMARY

A method for producing a radionuclide is disclosed. The method comprises irradiating a target material with a linear accelerator to produce a radionuclide, dissolving the irradiated target material comprising the radionuclide, and separating the radionuclide from the irradiated target material.

Another method for producing a radionuclide is disclosed. The method comprises irradiating a tungsten target material with a bremsstrahlung photon end-point energy of from about 15 MeV to about 50 MeV to produce a tungsten radionuclide, dissolving the irradiated target material comprising the tungsten radionuclide, and separating the tungsten radionuclide from the irradiated target material.

Yet another method for producing a radionuclide is disclosed. The method comprises irradiating a tungsten target material with a bremsstrahlung photon end-point energy of from about 15 MeV to about 50 MeV to produce tantalum-185 ($^{185}$Ta), $^{184}$Ta, $^{183}$Ta, or a combination thereof, dissolving the irradiated target material comprising the $^{185}$Ta, $^{184}$Ta, $^{183}$Ta, or the combination thereof, and separating the $^{185}$Ta, $^{184}$Ta, $^{183}$Ta, or the combination thereof from the irradiated target material.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

Figure 1:
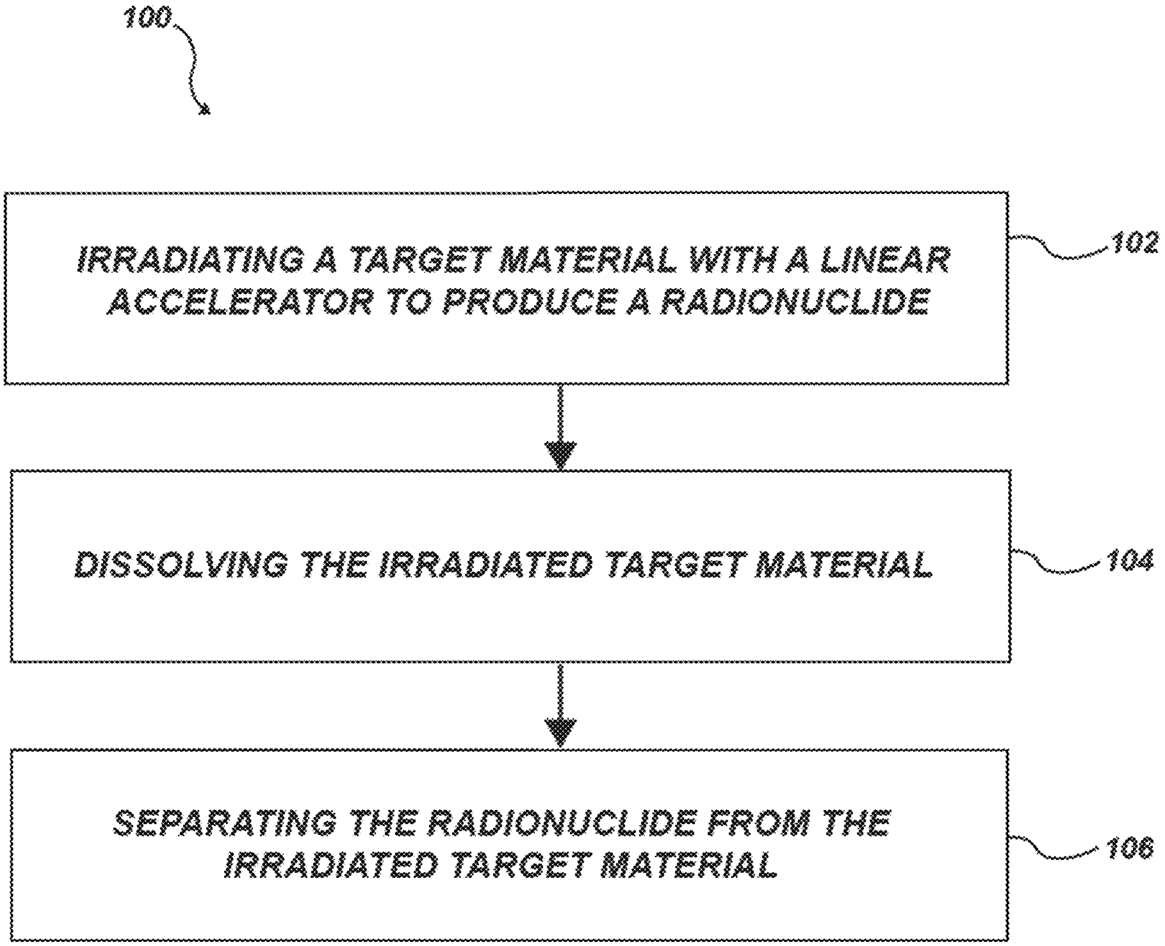
FIG. 1 is a flow chart illustrating a method for producing radionuclides in accordance with embodiments of the disclosure.

Methods for producing and separating radionuclides (e.g., radioactive isotopes) via bremsstrahlung irradiation and rapid chromatographic isotope separation are disclosed. The radionuclides may include short- and long-lived radionuclides, and the target material may be a natural target or an enriched target. The end-point energy of the bremsstrahlung radiation may be tailored (e.g., tuned) to enhance the production of at least one specific (e.g., desired, target) radionuclide. The produced radionuclide may then be separated and isolated from the target material via a rapid chromatographic separation process. By selecting the timing of the chemical separation(s), a specific radionuclide may be separated and isolated. The one or more chemical separations may be conducted shortly after conducting the bremsstrahlung irradiation act or may be conducted at a later time, enabling the desired radionuclide to be separated and isolated. The produced, separated, and recovered radionuclides may be used in applications including, but not limited to, nuclear medicine (e.g., the radionuclides may be used as radiopharmaceuticals, both diagnostic and therapeutic), isotope dilution mass spectrometry (e.g., the radionuclides may be used as radioactive tracers), basic radiochemistry research, environmental monitoring, fundamental nuclear science, and national security.

The following description provides specific details, such as concentrations, volumes, and/or other processing conditions (e.g., temperatures, pressures, flow rates, etc.), in order to provide a thorough description of the disclosed methods. However, a person of ordinary skill in the art will understand that embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "substantially all" means and includes greater than about 95%, such as greater than about 99%.

As used herein, the terms "about" and "approximately" in reference to a numerical value for a particular parameter is inclusive of the numerical value and a degree of variance from the numerical value that one of ordinary skill in the art would understand is within acceptable tolerances for the particular parameter. For example, "about" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure and such term is used in preference to the more restrictive term "is" so as to avoid any implication that other, compatible materials, structures, features, and methods usable in combination therewith should or must be excluded.

As used herein, the term "radionuclide" and its grammatical equivalents means and includes an atom that has excess nuclear energy, making it unstable. Radiation is released as the radionuclide decays and becomes more stable.

As used herein, the term "short-lived radionuclide" and its grammatical equivalents means and includes a radionuclide having a half-life ($t_1/2$) of less than or equal to about 1 week.

As used herein, the term "long-lived radionuclide" and its grammatical equivalents means and includes a radionuclide having a half-life ($t_1/2$) of greater than about 1 week.

As used herein, the term "half-life" and its grammatical equivalents means and includes the time over which one-half of the atoms of a particular radionuclide decay.

The processes described herein do not form a complete process flow for the related methods. The remainder of the methods are known to those of ordinary skill in the art. Accordingly, only the methods and conditions necessary to understand embodiments of the present materials and methods are described herein.

The illustrations presented herein are not meant to be actual views of any particular method of radionuclide production, but are merely idealized representations, which are employed to describe example embodiments of the disclosure. The figures are not necessarily drawn to scale. Additionally, elements common between figures may retain the same numerical designation.

The disclosure includes a method for producing radionuclides (e.g., a short-lived radionuclide such as tantalum-185 ($^{185}$Ta), tantalum-184 ($^{184}$Ta), tantalum-183 ($^{183}$Ta), or metastable tungsten-185 ($^{185m}$W), and/or a long-lived radionuclide such as tantalum-179 ($^{179}$Ta), tungsten-181 ($^{181}$W), tantalum-182 ($^{182}$Ta), or tungsten-185 ($^{185}$W)) using photonuclear reactions followed by separation (e.g., chemical separation) of the radionuclides. The method may be utilized to produce the radionuclides for use in a variety of applications, including in national security, radiochemistry research, environmental monitoring, fundamental nuclear science and nuclear medicine (e.g., radiopharmaceutical applications). For example, the radionuclides may be used as tracers in radiochemistry experiments, environmental or biological samples, or utilized in imaging techniques such as single-photon emission computerized tomography (SPECT) and positron emission tomography (PET) scans. The radionuclides may be utilized as therapeutic or diagnostic radiopharmaceuticals. They may also be used to deliver targeted doses of pharmaceuticals in drug-delivery applications.

The method according to embodiments of the disclosure includes irradiating a target (e.g., a natural tungsten (W) target, an enriched W target) using an electron linear accelerator (LINAC) or a synchrotron to produce the desired radionuclide via a nuclear reaction (e.g., W(γ, p) reaction). In addition to the desired radionuclide, other radionuclides may be produced following the irradiation. The method may also include dissolving the irradiated target and isolating the desired radionuclide via a chromatographic process. The chromatographic process may be conducted using a chromatographic system (e.g., a modified, low-pressure chromatographic system) that is configured to rapidly separate the desired radionuclide from the produced radionuclides. The desired radionuclide may be recovered at a high yield and a high purity, such as at maximum theoretical specific activity values, where substantially all of the atoms contain one isotope of the element. Therefore, the recovered radionuclide may be a so-called "no carrier added" radionuclide.

The use of short-lived radionuclides are of particular interest in nuclear medicine because they provide advantages such as reducing the over-saturation of target tissue, minimizing irradiation of non-target tissue, and providing labeling options for pharmaceuticals with fast pharmacokinetics. With longer-lived radionuclides, overdose is a common concern because they are expelled from the body slowly. A short-lived radionuclide, such as a radionuclide having a half-life ranging from minutes to hours, may be able to deliver a dosage of a pharmaceutical quickly, and would avoid issues of overdose. Additionally, no carrier added radionuclides are of interest in pharmaceutical applications because they avoid dilution of the active agent with non-radionuclide impurities and avoid issues with potential carrier toxicity.

Efficient production methods for short-lived radionuclides are challenging because many methods have production cross-sections with thresholds that are difficult to isolate from other reactions by the adjustment of incident particle energy. As a result, conventional production methods create products that have high stable-isotope concentrations and radioactive isotopic impurities. For example, a metastable nuclear isomer of technetium-99 ($^{99m}$Tc), the most widely used radionuclide in nuclear medicine, is generated from the decay of molybdenum-99 ($^{99}$Mo), which in turn is produced from the thermal neutron-induced fission of uranium-235 ($^{235}$U) with a yield rate of about 6%, making separation of the $^{99}$Mo from the numerous other fission products labor-intensive. Some attempted solutions have tried to produce short-lived radionuclides via direct proton bombardment (e.g., $^{100}$Mo(p,2n)$^{99m}$Tc). However, this has failed to meet the needs of the industry because such techniques use both mass separation to remove isotope contamination and chemical separation to remove isobaric contamination to produce a no carrier added radionuclide, and these added separations are inefficient.

Indirect isotope production via the production of a parent isotope may provide a higher yield route of no carrier added radionuclides because it produces a distinct chemical species that may be isolated in high purity via chemical separation techniques. However, this method often fails to meet the needs of the industry because additional chemical species are generated through this production method, which often cannot be separated without a considerable investment of time due to the low selectivity of the separation method for the two species. For example, dysprosium-157 ($^{157}$Dy) may be produced via proton irradiation of terbium (Tb), but either multiple extractions or clean-up acts are utilized to isolate $^{157}$Dy from Tb to a sufficient purity. This is of particular concern for short-lived radionuclides, as little of the relevant isotope may remain after such a lengthy separation process.

To meet these challenges, the methods according to embodiments of the disclosure include producing a radionuclide via the photonuclear reaction of a target material (e.g., tungsten (W), tantalum (Ta), hafnium (Hf), lutetium (Lu), silver (Ag), cadmium (Cd), tellurium (Te), tellurium oxide ($TeO_2$), sulfur (S), samarium oxide ($Sm_2O_3$), gold (Au), etc.), using a high energy bremsstrahlung photon beam coupled with a dissolution act and a separation act to separate the desired radionuclide.

FIG. 1 is a flow chart 100 illustrating a method according to embodiments of the disclosure for producing the desired radionuclide via the photonuclear reaction of the target material. The radionuclide may include, but is not limited to, tantalum-185 ($^{185}$Ta), tantalum-184 ($^{184}$Ta), tantalum-183 ($^{183}$Ta), metastable tungsten-185 ($^{185m}$W) tantalum-179 ($^{179}$Ta), tungsten-181 ($^{181}$W), tantalum-182 ($^{182}$Ta), tungsten-185 ($^{185}$W), tungsten-188 ($^{188}$W), molybdenum-99 ($^{99}$Mo), metastable technetium-99 ($^{99m}$Tc), carbon-11 ($^{11}$C), carbon-14 ($^{14}$C), nitrogen-13 ($^{13}$N), oxygen-15 ($^{15}$O), fluorine-18 ($^{18}$F), iodine-131 ($^{131}$I), palladium-103 ($^{103}$Pd), astatine-211 ($^{211}$At), bismuth-213 ($^{213}$Bi), phosphorous-32 ($^{32}$P), samarium-153 ($^{153}$Sm), gold-198 ($^{198}$Au), silver-111 ($^{111}$Ag), silver-110 ($^{110}$Ag), cadmium-115 ($^{115}$Cd), or a combination thereof. The radionuclide may be a short half-life radionuclide that exhibits a half-life of less than about 24 hours, such as from about 5 minutes to about 15 hours, from about 10 minutes to about 5 hours, from about 30 minutes to about 3 hours, from about 5 minutes to about 90 minutes, or from about 30 minutes to about 90 minutes. Alternatively, the radionuclide may be a long half-life radionuclide that exhibits a half-life of greater than about 1 week, such as greater than about 1 year (e.g., from about 1 year to about 2 years).

As shown in act 102, the method 100 for producing the radionuclide may include irradiating a target material with a linear accelerator or a synchrotron to produce one or more radionuclides. The target material may be exposed to bremsstrahlung irradiation to produce the one or more radionuclides. The radionuclide may be produced by selecting the bremsstrahlung X-ray end-point energy produced by the linear accelerator within a range of from about 15 MeV to about 50 MeV, such as from about 20 MeV to about 45 MeV, from about 20 MeV to about 44 MeV, from about 20 MeV to about 40 MeV, from about 20 MeV to about 35 MeV, from about 20 MeV to about 30 MeV, from about 25 MeV to about 35 MeV, or from about 22 MeV to about 26 MeV. By using an energy within this range, the radionuclide production from the target material may be maximized. The bremsstrahlung end-point energy may be selected to produce a specific radionuclide. As a non-limiting example, the bremsstrahlung end-point energy may be about 22 MeV to more efficiently produce $^{185}$Ta, a short-lived radionuclide, from a tungsten target, and this radionuclide may be produced via a $^{186}W$ (7, p)$^{185}Ta$ reaction. These end-point energies are readily achievable by hospital-based medical linear accelerators or synchrotrons and, thus, have potential as a method for in-house "dose-on-demand" production of radiopharmaceuticals, including $^{185}Ta$. By using equipment available at a hospital, the radionuclide may be produced and separated at the hospital, enabling the production of radionuclides having half-lives on the order of minutes or hours to be used in medical applications.

The target material may be selected to produce the desired radionuclide. By way of example only, the target material may include, but is not limited to, tungsten (W), tellurium (Te), tellurium oxide ($TeO_2$), sulfur (S), samarium oxide ($Sm_2O_3$), gold (Au), etc. As another non-limiting example, the target material may include a natural target (e.g., natural tungsten) or an isotopically enriched target (e.g., $^{186}W$). Using an isotopically enriched target material may reduce the amount of contaminants produced during the irradiation. The contaminants may include, but are not limited to, other isotopes and products created by the photonuclear reaction that are not the desired radionuclide. The target material used in the LINAC or the synchrotron may have a thickness in a range of from about 0.01 mm to about 1 mm (e.g., about 0.1 mm), and a mass ranging from about 0.1 g to about 5 kg, and more particularly from about 100 g to about 200 g.

Following production of the radionuclide, the irradiated target material may be removed from the linear accelerator or synchrotron and dissolved. The irradiated target material containing the desired radionuclide may be dissolved, as shown in act 104, in a vessel. The irradiated target material may be dissolved in a solvent, such as in an acid, base, redox reagent, or a combination thereof. The acid may be nitric acid ($HNO_3$), hydrochloric acid (HCl), hydrofluoric acid (HF), other mineral acid, or a combination thereof. The base may be sodium hydroxide (NaOH), ammonium hydroxide ($NH_4OH$), or a combination thereof. The redox reagent may include, but is not limited to, hydrogen peroxide ($H_2O_2$). The irradiated target material and the solvent may be combined in the vessel in a relative ratio that achieves substantial dissolution of the irradiated target material depending on the composition of the target material. The dissolution process may be accomplished in less than about 5 minutes, and more specifically, in less than about 1 minute. In some embodiments, the solvent utilized for dissolution includes a combination of nitric acid:hydrofluoric acid ($HNO_3$:HF) in a ratio of about 1:1, about 1:2, or about 1:3.

As shown in act 106, the radionuclide may be separated from the irradiated target material following the methods and using the systems described in U.S. Patent Pub. No. US2020/0108348A1, the disclosure of which is hereby incorporated, in its entirety, by this reference. The systems and chromatographic methods described in the published application may be scaled up to accommodate larger sample sizes and greater production yields. A chromatography column may be coupled (e.g., directly coupled) with the vessel and used to chromatographically separate (e.g., chemically separate) the desired radionuclide. The chromatographic conditions used to separate the radionuclide include using extraction chromatographic resins or ion exchange resins under a variety of hydrochloric acid (HCl), nitric acid ($HNO_3$), hydrogen peroxide ($H_2O_2$), and hydrofluoric acid (HF) eluent conditions. The dissolution vessel may, for example, be directly coupled with a low-pressure chromatography column that includes TEVA resin, as described in U.S. Patent Pub. No. US2020/0108348A1. The eluent may be flowed through the chromatography column, separating the desired radionuclide from the irradiated target material. The separation process may be conducted in less than about 60 minutes, such as from about 1 minute to about 20 minutes, from about 1 minute to about 30 minutes, from about 5 minutes to about 20 minutes, from about 5 minutes to about 30 minutes, or from about 15 minutes to about 45 minutes. By directly coupling the chromatography column and the dissolution vessel, matrix transpositions may be avoided, which mitigates sample loss and decreases the total separation time. Thus, the irradiation process, the dissolution process, and the separation process according to embodiments of the disclosure improves the efficiency of the overall production method and preserves the majority of the radionuclide that is produced from the method. For example, greater than about 50% by weight of the radionuclide may be preserved, such as greater than about 60% by weight, greater than about 70% by weight, greater than about 80% by weight, greater than about 90% by weight, or greater than about 95% by weight. As a result of being highly favored in the irradiation process, the short-lived radionuclide is substantially free from contamination by other isotopes and products (e.g., it is a no carrier added radionuclide). For example, the separated and recovered radionuclide may be greater than about 90% pure, greater than about 95% pure, greater than about 98% pure, or greater than about 99% pure. In addition, the percent yield of the recovered radionuclide may be greater than about 90%, and more particularly, greater than about 95%. Additionally, the separation process may be sequentially repeated after allowing a period of time for at least one of the produced isotopes to decay to the desired radionuclide.

The production method according to embodiments of the disclosure, including the irradiation process, the dissolution process, and the separation process, may be conducted within a total amount of time that is substantially less than conventional process for producing the desired radionuclide. The target retrieval and irradiation process may be completed within from about 30 seconds to about 15 minutes (e.g., within from about 1 minute to about 5 minutes). Dissolution of the irradiated target material may be completed in less than about 5 minutes, and more specifically, in less than about 1 minute. Separation of the radionuclide from the irradiated target material may be completed in less than about 1 hour, and more specifically, in less than about 30 minutes. With respect to the separation process, removal of the irradiated target material may be completed within from about 5 minutes to about 30 minutes (e.g., within from about 15 minutes to about 20 minutes), and separation of the desired radionuclide (e.g., elution of the radionuclide) may be completed within from about 1 minute to about 15 minutes (e.g., within from about 5 minutes to about 10 minutes). In total, the irradiating, the dissolving, and the separating acts may be conducted within a total radionuclide production time of less than about five hours, and more particularly, between from about 1 hour to about 2 hours.

Figure 2A:
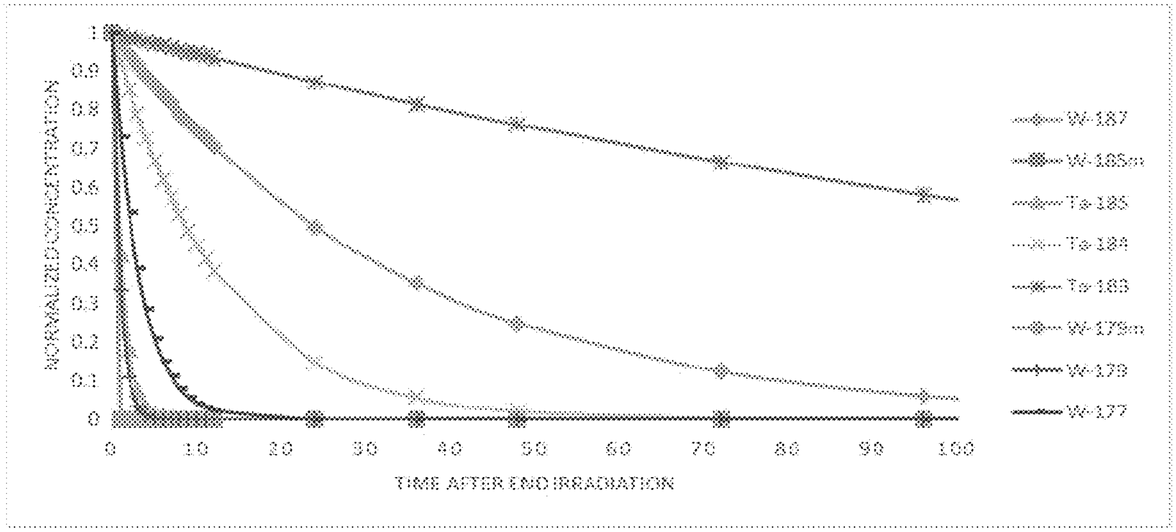
FIG. 2A is a graph illustrating the decay of radionuclides produced from irradiations performed in accordance with embodiments of the disclosure.
Figure 2B:
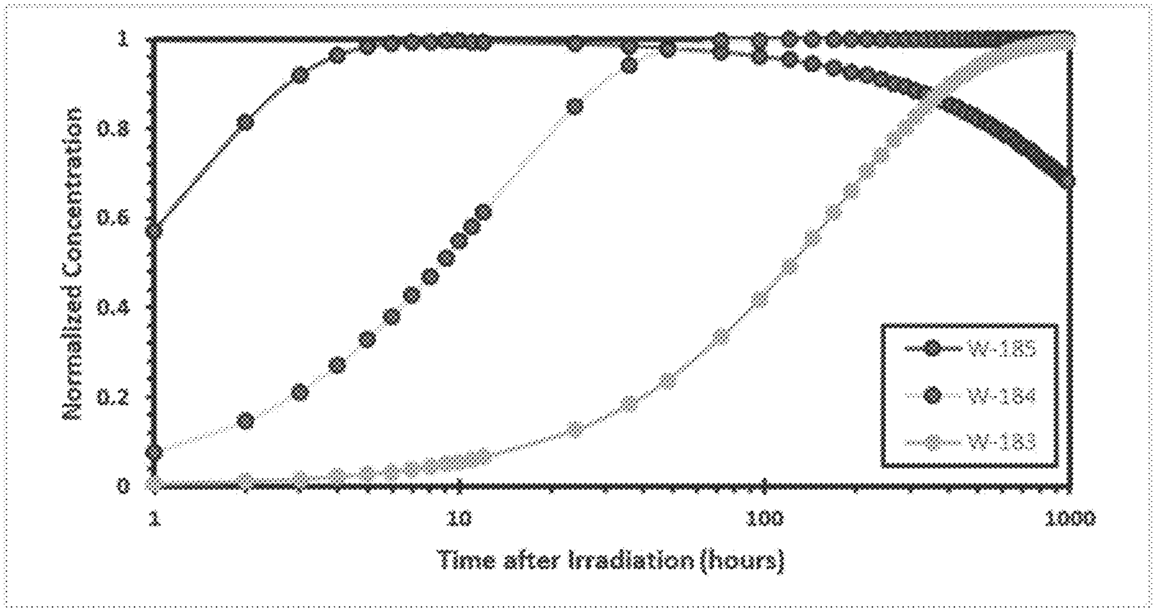
FIG. 2B is a graph illustrating the in-growth of tungsten radionuclides as a function of time following irradiations performed in accordance with embodiments of the disclosure.

Embodiments of the disclosure will now be described with reference to FIGS. 2A and 2B. FIG. 2A is a graph illustrating the decay of specific radionuclides ($^{187}W$, $^{185m}W$, $^{179m}W$, $^{179}W$, $^{177}W$, $^{185}Ta$, $^{184}Ta$, $^{183}Ta$) produced from irradiation of a natural tungsten foil after the irradiation has been completed. The decay is shown as a function of time. FIG. 2B is a graph illustrating the in-growth of specific tungsten radionuclides ($^{185}W$, $^{184}W$, $^{183}W$) as a function of time after irradiation has been completed. As shown by FIGS. 2A and 2B, the purity and yield of the target radionuclides may be tailored (e.g., maximized) by selecting the timing of chemical separations. More particularly, a specific radionuclide may be efficiently isolated by appropriately selecting the bremsstrahlung end-point energy utilized in the irradiation process and then appropriately selecting when the separation process is performed. For example, one radionuclide may be allowed to decay into a different radionuclide in order to isolate the target (e.g., desired) radionuclide.

By appropriately selecting the end-point energy, the average charge per pulse, the repetition rate, the mass of the target, the electron to photon radiation, and the irradiation time, a maximal amount of the desired radionuclide may be produced during the irradiation process. By appropriately selecting the solvent and the relative ratio of the irradiated target material to the solvent during the dissolution process, a maximal amount of the desired radionuclide may be solubilized and subjected to the separation process. By appropriately selecting the eluent, the eluent conditions, and timing of the one or more separation processes, the desired radionuclide may be effectively separated from the irradiated target material.

The following examples serve to further illustrate embodiments of the disclosure in more detail. These examples are not to be construed as being exhaustive or exclusive as to the scope of this disclosure.

EXAMPLES

Example 1

Radionuclide Production Irradiation Investigations

A series of several irradiations with adjustments to the bremsstrahlung end-point energy were performed to experimentally evaluate the photonuclear production of tungsten and tantalum radionuclides as a function of photon energy. Natural tungsten foils with thicknesses of about 0.1 mm (99.95% elemental purity, GoodFellow) and masses ranging from about 0.62 g to about 0.70 g were utilized as the target materials. Irradiations at bremsstrahlung end-point energies of about 22 MeV, about 26 MeV, about 30 MeV, and about 38 MeV were performed using the 44 MeV L-band electron LINAC at the Idaho Accelerator Center (IAC) at Idaho State University (ISU). The targets were placed at the face of the tungsten converter on the downstream side, at the end of the acceleration beam pipe. The repetition rate for all irradiations was maintained at about 150 Hz and the average charge per LINAC pulse varied with the electron energy. Table 1 lists the end-point energy, the average charge per pulse, the repetition rate, the masses of the target foils, and the irradiation time for these individual irradiation experiments.

TABLE 1

Experimental parameters for series of natural tungsten irradiations on the 44 MeV L-band LINAC

| Endpoint Energy (MeV) | Average Charge per Pulse (nC) | Repetition Rate (Hz) | Mass of Target (g) | Irradiation Time (min) |
|---|---|---|---|---|
| 22 | 564.912 | 150 | 0.6770 | 15 |
| 26 | 566.188 | 150 | 0.7001 | 10 |
| 30 | 331.659 | 150 | 0.6842 | 15 |
| 38 | 211.007 | 150 | 0.6219 | 10 |

Post-irradiation target foils and solutions from the chemical separations were counted at about 30 cm from the face of the detector using both a Canberra GC3318 n-type high-purity germanium (HPGe) detector and a mechanically-cooled Ortec GMX n-type HPGe detector, to allow for multiple gamma ray spectroscopic measurements to be taken simultaneously. Energy efficiency curves and detector energy calibrations were repeatedly performed on both systems prior to a day of measurements using a series of National Institutes of Standards and Technology (NIST) traceable gamma ray spectrometry calibration sources (CAL2600, North American Scientific; GF-057-M, Eckert and Ziegler; 2600, Eckert and Ziegler) with gamma ray energies ranging from about 53 keV to about 1408 keV.

Figure 3:
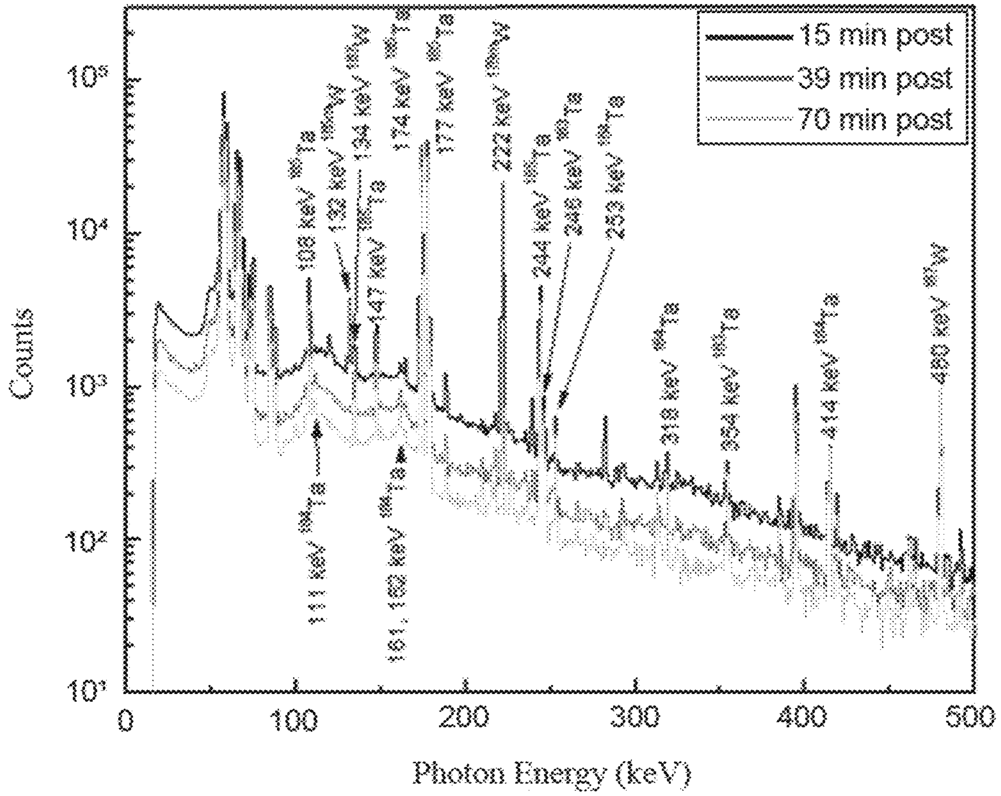
FIG. 3 is a graph illustrating the gamma spectra of a natural target material following its irradiation with bremsstrahlung photon end-point energy in accordance with embodiments of the disclosure.

To show the feasibility of $^{185}Ta$ generation from the photonuclear activation of $^{186}W$, high-elemental purity natural tungsten foils were first irradiated at a bremsstrahlung end-point energy of about 22 MeV. The resulting gamma spectra of the post irradiated foil are shown in FIG. 3. The gamma spectra were measured at 15 minutes, 39 minutes, and 70 minutes after the irradiation. $^{185}Ta$, produced via the $^{186}W(\gamma,p)^{185}Ta$ reaction, was readily observed, as were additional Ta isotopes, specifically $^{183}Ta$ and $^{184}Ta$. In this case, $^{184}Ta$ was produced primarily via $^{186}W(\gamma,n+p)^{184}Ta$ reactions and $^{183}Ta$ primarily via $^{184}W(\gamma,p)^{183}Ta$ reactions. In this current example, the desired radionuclide is $^{185}Ta$ in the absence of, to the maximum extent possible, $^{183}Ta$, $^{184}Ta$, or other tantalum isotopes. Hence, further investigation of $^{185}Ta$ in this context was explored.

The composition of natural tungsten includes five stable isotopes: $^{180}W$, $^{182}W$, $^{183}W$, $^{184}W$, $^{186}W$ with relative abundances of about 0.12%, about 26.50%, about 14.31%, about 30.64% and about 28.43%, respectively. The photonuclear reaction cross-sections of each W isotope vary with incident photon energy, so a systematic study of the potential $^{185}Ta$ yield as a function of bremsstrahlung end-point energy was conducted. Natural tungsten targets were irradiated at nominal bremsstrahlung end-point energies of 22 MeV, 26 MeV, 30 MeV, and 38 MeV, and the production rates of many radiometrically detectable isotopes were measured via gamma spectrometry, the graph of which is shown in FIG. 4B.

Figure 4A:
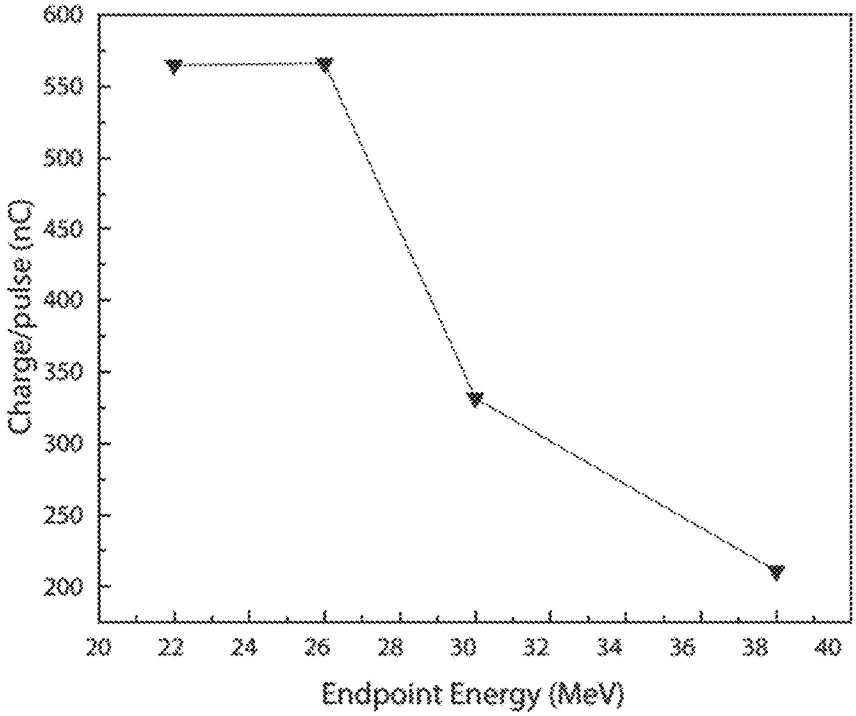
FIG. 4A is a graph illustrating the charge per pulse of irradiations performed in accordance with embodiments of the disclosure.
Figure 4B:
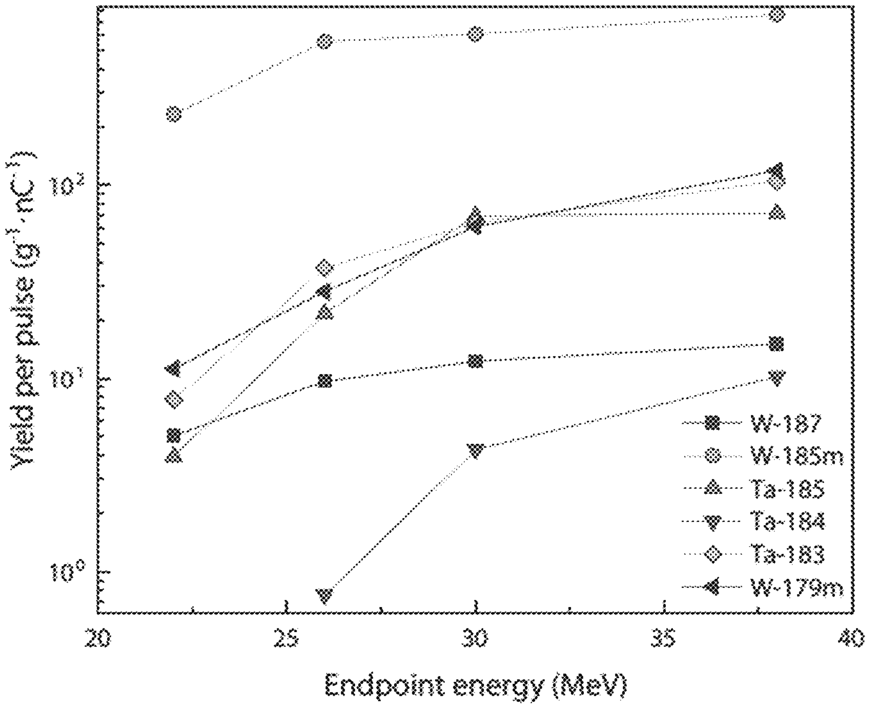
FIG. 4B is a graph illustrating the atoms of radiometrically detectable isotopes that are produced per pulse and gram of target material as a function of bremsstrahlung photon end-point energy in accordance with embodiments of the disclosure.

FIG. 4A shows a graph of the average electron charge per pulse of the 44 MeV L-band LINAC at the IAC as a function of electron energy. FIG. 4B shows the number of radiometrically detectable W and Ta isotopes produced per LINAC pulse, per unit electron charge, and per gram and gram of W target material at each bremsstrahlung end-point energy considered.

Over the 22-38 MeV end-point energy range studied, $^{183}Ta$, $^{184}Ta$ and $^{185}Ta$ were the only radioactive Ta nuclides observed. The production rates of these three tantalum isotopes, as a function of bremsstrahlung endpoint energy, are summarized in Table 2, where the activities are reported at the end of irradiation and errors represent 1-sigma uncertainties.

TABLE 1

| Experimentally observed $^{183}Ta$, $^{184}Ta$, and $^{185}Ta$ production rates as a function of bremsstrahlung end-point energies | | | | | | |
|---|---|---|---|---|---|---|
| Bremsstrahlung End-point Energy (MeV) | Specific Activity $^{183}Ta$ (μCi/g-target/hr) | Specific Activity $^{184}Ta$ (μCi/g-target/hr) | Specific Activity $^{185}Ta$ (μCi/g-target/hr) | Percent Specific Activity $^{183}Ta$ | Percent Specific Activity | Percent Specific Activity |
| 22 | 0.138 ± 0.003 | 0 | 9.376 ± 0.028 | 1.5% | 0 | 98.6% |
| 26 | 0.486 ± 0.036 | 0.138 ± 0.009 | 39.197 ± 1.965 | 1.2% | 0.3% | 98.4% |
| 30 | 0.488 ± 0.035 | 0.452 ± 0.025 | 70.631 ± 3.493 | 0.7% | 0.6% | 98.7% |
| 38 | 0.509 ± 0.037 | 0.692 ± 0.039 | 51.404 ± 2.584 | 1% | 1.3% | 97.7% |

The produced activity of $^{185}Ta$, relative to $^{183}Ta$ and $^{184}Ta$, was maximized at an end-point energy of 30 MeV with a yield of 98.7%; $^{183}Ta$ and $^{184}Ta$ relative activities were 0.7% and 0.6%, respectively.

Figure 5:
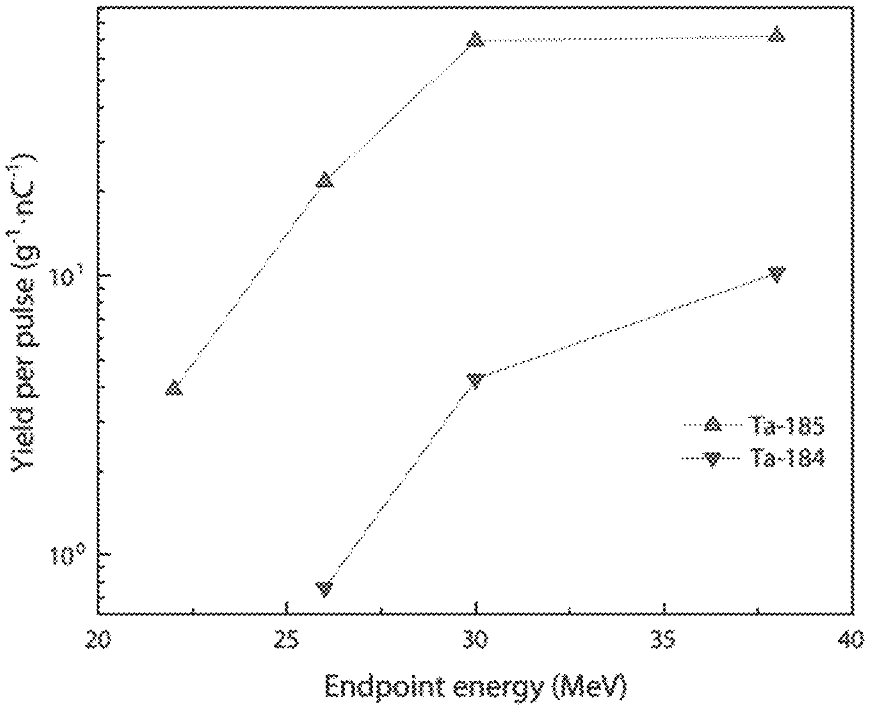
FIG. 5 is a graph illustrating the atoms of Ta-184 and Ta-185 radionuclides produced per linear accelerator (LINAC) pulse as a function of bremsstrahlung photon end-point energy in accordance with embodiments of the disclosure.

A graph of the production of rates of $^{184}Ta$ and $^{185}Ta$ per LINAC pulse are shown as a function of bremsstrahlung endpoint energy in FIG. 5. While the production rate of $^{185}Ta$ was maximized at about 30 MeV, the production of $^{184}Ta$ grows rapidly between about 22 MeV and about 30 MeV. And, while the measured production rate of $^{185}Ta$ at about 22 MeV was a factor of 7.5 lower than at about 30 MeV, for the purposes of producing no carrier added $^{185}Ta$, it was determined that it may be more useful to work at less than about 22 MeV because the minimal amount of $^{184}Ta$ generated at or below 22 MeV is essentially negligible. Thus, it was determined that irradiating a $^{186}W$ enriched target with a bremsstrahlung photon end-point energy of less than about 22 MeV would be a promising route toward no carrier added $^{185}Ta$ production.

Example 2

Target Dissolutions and Distribution Coefficient Evaluations

Investigation of the approach for dissolving the metal W target material was performed through systematic reaction of natural W metal powder (99.9%, Alpha Aesar) with a variety of trace metal grade, acidic ($HNO_3$, HCl, HF), basic (sodium hydroxide (NaOH), ammonium hydroxide ($NH_4OH$)), and redox (hydrogen peroxide ($H_2O_2$)) reagents. A 1:2 combination of $HNO_3$:HF was identified as an advantageous combination for achieving rapid, controlled dissolution without perturbation of the W oxidation state in solution.

Coupling of the $HNO_3$+HF dissolver solution to a chromatographic separation approach was performed through systematic evaluation of the W and Ta distribution coefficient (Kd) values on several commercially available extraction chromatographic resins (Eichrom's TEVA, TRU, and UTEVA resins) under varying $HNO_3$, HCl, and HF conditions.

Kd values were determined using a batch contact method. In short, small masses of dry resin (about 50 mg) were contacted with solutions containing about 500 ppb W and Ta (High Purity Standards) and varying concentrations of HF (ranging from about 0.01 M to about 9 M). After solution contact with the resin for approximately 2 hours, the solid resin particles were filtered, and the aqueous fractions were diluted with about 2% $HNO_3$ and analyzed via quadrupole ICP-MS (Thermofisher iCAP Q). The quantity of analyte in the aqueous phase was determined directly (via external calibration using a High Purity Standards W concentration standard solution), and the quantity of analyte associated with the solid phase was determined via mass balance (total quantity added minus quantity detected in aqueous phase).

Based upon knowledge gained through batch sorption studies, separations of W from Ta using TEVA resin were further refined via chromatographic separations using non-radioactive surrogate samples initially containing about 500 ppb W and about 500 ppb Ta in 3.2 M $HNO_3$+11.6 M HF (mimicking a 2 mL HF+1 mL $HNO_3$ dissolver solution that had been diluted to about 5 mL with 17.8 MΩ $H_2O$). Separations were initially tested using a 2 mL Bio-rad polyprep column packed with about 2 mL of TEVA resin (having a particle size within a range from about 100 μm to about 150 μm). Samples were loaded using 5 mL of the load solution (3.2 M $HNO_3$+11.6 M HF), and then W was eluted using 20 mL of 6 M HCl+0.02 M HF. Elution of the Ta fraction was then performed using 20 mL of 6 M $HNO_3$+0.02 M HF.

Of all the combinations investigated, a mixture of $HNO_3$/HF was observed to result in complete dissolution of the W metal within a short time frame (e.g., less than about 5 minutes), and partial dissolution was achieved with $H_2O_2$ and $H_2O_2/HNO_3$ solutions. When about 0.5 g of W was reacted with 1 mL $HNO_3$ (concentrated) and 2 mL HF (concentrated), the solution was observed to bubble vigorously and the entire solution turned a clear, colorless solution in less than about 45 seconds. In order to utilize this rapid dissolution approach, chemical separation conditions were selected for high HF loading conditions through batch sorption studies. The studies found that UTEVA, TEVA, and TRU resins (Eichrom) resulted in excellent separation of W from Ta, with distribution coefficient (Kd) values above 50 for each and reaching a maximum value on the order of 102 in the 0.2 M to 1 M HF range.

Example 3

Rapid Chromatographic Isotope Separation System (RCISS) Development

For minimization of the time between irradiation and chemical isolation of $^{185}Ta$ from the bulk W target, a simple dissolution-chemical separation system and related method was developed, as disclosed in U.S. Patent Pub. No. US2020/0108348A1. The system, termed the Rapid Chromatographic Isotope Separation System (RCISS), included a dissolution reagent vessel (15 mL Savillex PFA vial with dual port lid) connected to a dissolver vessel (60 mL Savillex PFA vial with a dual port lid) that was connected to an Omnifit low pressure chromatography column specially modified with a PFA liner to enable sample loading in high HF conditions.

Upon irradiation, the W target material was placed in the dissolution vessel and dissolution reagents were immediately pumped (via peristaltic pump) to the dissolver vessel to completely dissolve the W target. Because the dissolution of W in $HNO_3$:HF was very vigorous and produced appreciable NOx and other gases, the separation system was slightly vented via usage of a 1/16" tubing rather than 1/8" tubing to completely seal the dissolution vessel, minimizing the potential for over-pressurization of the dissolver vessel containing the hazardous $HNO_3$:HF solution. The dissolver solution was then pumped onto the column and the dissolver vessel was rinsed with several mL of 6 M HCl+0.02 M HF for quantitative transfer. Bulk W target material was then eluted from the column by pumping 20 mL of 6 M HCl+0.02 M HF at a rate of about 2.5 mL per minute, following which Ta was eluted using 20 mL of 6 M $HNO_3$+0.02 M HF (also at about 2.5 mL per minute). During method development experiments, analyses of the total W and Ta content were performed using quadrupole ICP-MS, with concentrations determined via external calibration using dilutions from a W concentration standard solution (High Purity Standards).

Example 4

End-to-End Production, Target Dissolution, Chemical Separations, and Radionuclide Quantification A natural isotopic tungsten foil target (99.95% metal basis, Alfa Aesar) having a thickness of about 0.1 mm and a mass of about 0.0990 g was irradiated using the 25 MeV S-band electron LINAC at the IAC. The target was irradiated for about 1 hour with a pulsed bremsstrahlung beam at a repetition rate of about 150 Hz and an average beam charge of about 215.32 nC/pulse. The target was irradiated at a bremsstrahlung X-ray end-point energy of 20 MeV. The target foil was placed about 8.25 cm from the electron window and the tungsten converter was placed at about 4.7 cm from the electron window. Following irradiation, foils were transferred to a chemical hood in an adjacent laboratory and placed in the RCISS dissolution vessel. Dissolution of the irradiated target began 13:58.35 minutes following the final LINAC pulse. Dissolution was then performed via addition of about 3 mL of 1:2 $HNO_3$:HF mixture. Upon dissolution, an additional 2 mL of 17.8 MΩ $H_2O$ was added and the total dissolver solution mass was determined. A 100 μL aliquot of the dissolver solution was obtained gravimetrically for gamma spectral analysis, and the remainder of the dissolver solution was pumped onto a 3 cm×10 mm (ID) RCISS column packed with TEVA resin. The dissolver vessel was then rinsed once with 6 M HCl+0.02 M HF and the bulk W target material was eluted using 20 mL of 6 M HCl+0.02 M HF. Following W elution, Ta was eluted using 20 mL of 6 M $HNO_3$.

Figure 6B:
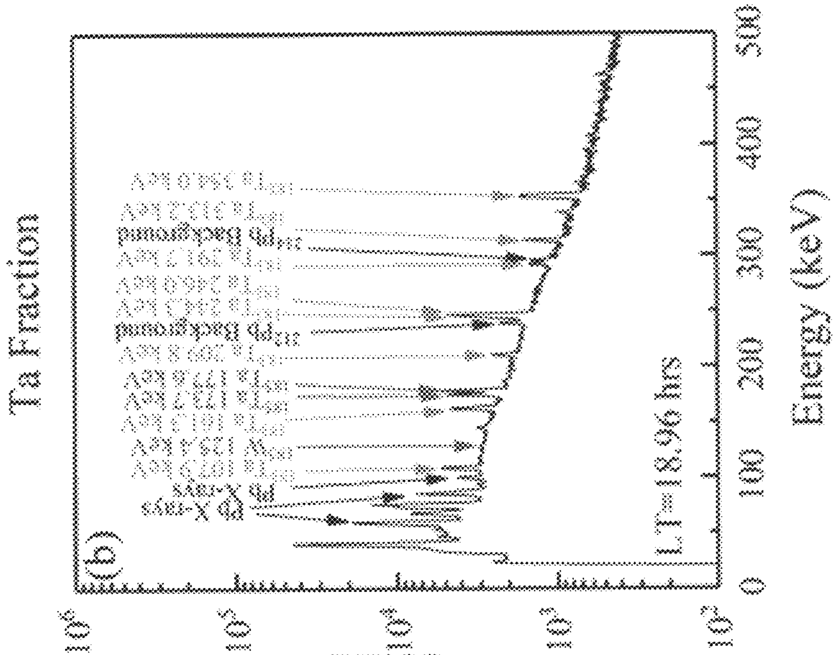
FIGS. 6A and 6B are graphs illustrating the gamma spectra of purified isotopes produced from the disclosed method at a 20 MeV bremsstrahlung end-point energy about 66 minutes post-irradiation.
Figure 6A:
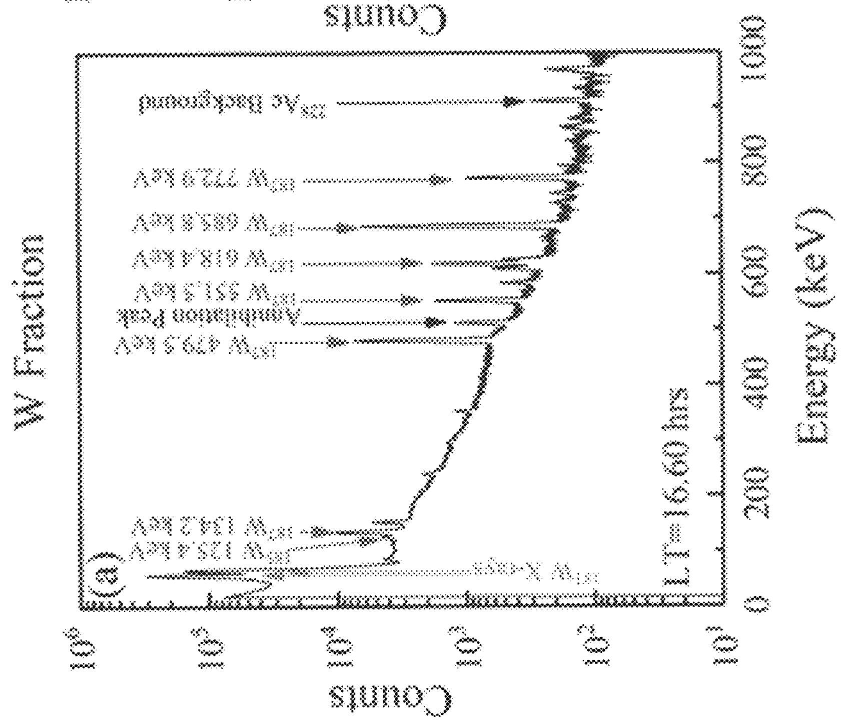

The total quantities of purified W and Ta solutions were then determined gravimetrically and analyzed via gamma spectroscopy, as shown in FIGS. 6A and 6B. The live-time of the measurements were 16.64 hours, as shown in FIG. 6A, and 18.96 hours, as shown in FIG. 6B. The gamma ray spectroscopic measurements occurred 66.54 minutes post-irradiation. FIGS. 6A and 6B show that the method created pure fractions of W and Ta. There was no measured $^{187}$W on the column, no detected tantalum isotopes in the W fraction, and no detected $^{187}$W in the tantalum fraction. The time between the end of irradiation and the end of the chemical separation was 122.007 minutes.

In total, the separation process was completed within about 5 hours (five times the half-life of $^{185}$Ta). In terms of the total timeline of the method, target retrieval was completed within about 2 minutes, dissolution was completed within about 1 minute, W removal was completed in about 17 minutes, Ta elution was completed in about 8 minutes, and gamma spectroscopy was completed in about 1 minute. From end-to-end, evaluation of the total time between irradiation and gamma spectroscopy was 29 minutes.

Example 5

Estimate of Radionuclide Recovery

From target retrieval to final verification via gamma spectrometry, the target dissolution and Ta isolation is completed within about 30 minutes. This equals approximately 0.6 half-lives, or a decay of about 35% of the $^{185}$Ta radionuclide (e.g., a decay to about 65% of the original).

The target dissolution and Ta separation is completed within about 30 minutes. The Ta is transported from the hospital-based LINAC to a patient within about 10 minutes. In comparison, a 60 minute transportation time is commonly observed between a LINAC in a more remote geographic location and the patient. The 50 minute difference greatly reduces transfer time from irradiation to separation and increases the $^{185}$Ta recovered by a factor of about two. By irradiating the target in the hospital-based LINAC according to embodiments of the disclosure, the time between target irradiation and target dissolution is minimized while the $^{185}$Ta recovery is maximized.

Although the foregoing descriptions contain many specifics, these are not to be construed as limiting the scope of the disclosure, but merely as providing certain exemplary embodiments. Similarly, other embodiments of the disclosure may be devised that do not depart from the scope of the disclosure. For example, features described herein with reference to one embodiment may also be provided in others of the embodiments described herein. The scope of the embodiments of the disclosure is, therefore, indicated and limited only by the appended claims and their legal equivalents, rather than by the foregoing description. All additions, deletions, and modifications to the disclosure, as disclosed herein, which fall within the meaning and scope of the claims, are encompassed by the disclosure.

What is claimed is:

1. A method for producing no carrier added $^{185}$Ta, radionuclide, comprising:

irradiating a tungsten target material with a linear accelerator to produce one or more radionuclides including the $^{185}$Ta;

dissolving the irradiated tungsten and the $^{185}$Ta in one or more mineral acids to form an acidic solution consisting of the irradiated tungsten target material, one or more radionuclides including the $^{185}$Ta, and the one or more mineral acids; and selectively separating the one or more radionuclides including the $^{185}$Ta:

from the irradiated tungsten target material; and recovering a no carrier added $^{185}$Ta radioisotope preparation with a specific activity of greater than 97%.

2. The method of claim 1 wherein the irradiating comprises irradiating with a bremsstrahlung photon end-point energy of from about 15 MeV to about 50 MeV.

3. The method of claim 1, wherein the irradiating comprises irradiating with a bremsstrahlung photon end-point energy of from about 20 MeV to about 30 MeV.

4. The method of claim 1, wherein the one or more mineral acids include nitric acid ($HNO_3$), hydrochloric acid (HCl), or hydrofluoric acid (HF).

5. The method of claim 1, wherein the one or more mineral acids comprises nitric acid ($HNO_3$) and hydrofluoric acid (HF).

6. The method of claim 1, wherein the tungsten target material is isotopically enriched.

7. The method of claim 1, wherein the tungsten target material is enriched in $^{186}W$ and the irradiating comprises irradiating with a bremsstrahlung photon end-point energy of less than about 22 MeV.

8. A method for producing a radioactive isotope, comprising:

irradiating a natural tungsten target material comprising one or more of $^{180}W$, $^{182}W$, $^{183}W$, $^{184}W$, and $^{186}W$ with a bremsstrahlung photon end-point energy of from about 22 MeV to about 26 MeV to produce $^{185}Ta$;

dissolving the irradiated natural tungsten target material comprising the produced $^{185}Ta$ in one or more mineral acids to form an acidic solution comprising the $^{180}W$, $^{182}W$, $^{183}W$, $^{184}W$, and $^{186}W$ and the $^{185}Ta$; and separating the $^{185}Ta$ from the $^{180}W$, $^{182}W$, $^{183}W$, $^{184}W$, and $^{186}W$ irradiated within less than or equal to about 30 minutes after the irradiating; and recovering a no carrier added $^{185}Ta$ radioisotope preparation with a specific activity of greater than 97%.

9. The method of claim 8, wherein the irradiating is performed with a linear accelerator.

10. The method of claim 8, wherein the irradiating is performed with a synchrotron.

11. The method of claim 8, wherein the one or more mineral acids is nitric acid and hydrofluoric acid in a ratio of 1:2 nitric acid: hydrofluoric acid.

12. A method for producing a radioactive isotope, comprising:

irradiating a tungsten target material exhibiting an elemental purity of about 99.95% with a bremsstrahlung photon end-point energy of about 22 MeV to produce $^{185}Ta$, $^{184}Ta$, $^{183}Ta$, or a combination thereof;

dissolving the produced $^{185}Ta$, $^{184}Ta$, $^{183}Ta$, or the combination thereof and the irradiated tungsten target material in nitric acid and hydrofluoric acid to form an acidic solution containing the $^{185}Ta$, $^{184}Ta$, $^{183}Ta$, or combination thereof and the tungsten target material; and separating the produced $^{185}Ta$, $^{184}Ta$, and $^{183}Ta$ from the tungsten target material; and recovering a no carrier added $^{185}Ta$ radioisotope preparation with a specific activity of greater than 97%.

13. The method of claim 12, wherein a yield of the $^{185}Ta$ is about 90%.

14. The method of claim 12, wherein the tungsten target material is a natural tungsten target material.

* * * * *